Figure 1:
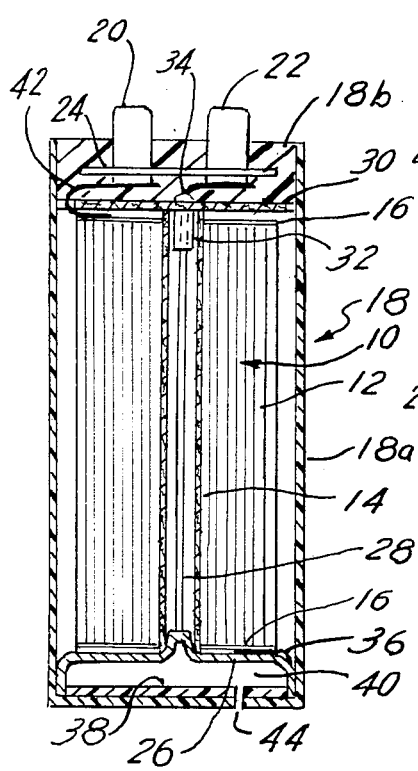

United States Patent [19]
Robinson

[11] Patent Number: 4,748,536
[45] Date of Patent: May 31, 1988

[54] PROTECTED CAPACITORS

[76] Inventor: William M. Robinson, 251 Nemasket St., New Bedford, Mass. 02740

[21] Appl. No.: 3,479

[22] Filed: Jan. 15, 1987

[51] Int. Cl.$^4$ .............................................. H01G 1/06
[52] U.S. Cl. .................................................... 361/272
[58] Field of Search .......... 361/272, 274, 275, 433 W, 361/433 V, 433 H, 433 T

[56] References Cited

U.S. PATENT DOCUMENTS

| | | | |
|---|---|---|---|
| 2,144,959 | 1/1939 | Blackburn | 361/272 |
| 2,896,049 | 7/1959 | Maier | 361/275 |
| 3,185,905 | 5/1965 | Sternbeck | 361/272 |
| 3,248,617 | 4/1966 | Hynes et al. | 361/272 |
| 3,575,565 | 4/1971 | Grunert et al. | 361/275 |
| 3,909,683 | 9/1975 | Kysely | 361/274 |
| 4,059,848 | 11/1977 | Koel et al. | 361/272 |
| 4,240,126 | 12/1980 | Sanvito | 361/274 |
| 4,245,277 | 1/1981 | Van Gils et al. | 361/433 V |
| 4,577,257 | 3/1986 | Erhardt et al. | 361/433 V |

FOREIGN PATENT DOCUMENTS

| | | | |
|---|---|---|---|
| 2120611 | 11/1972 | Fed. Rep. of Germany | 361/272 |
| 2821563 | 11/1979 | Fed. Rep. of Germany | 361/272 |

Primary Examiner—Donald A. Griffin

[57] ABSTRACT

The disclosed capacitors include an assembly of a wound capacitor section having at least one metallized electrode, being prone to develop explosive pressure when a fault occurs, and an interrupter in series with the capacitor section. The interrupter cooperates mechanically with the wound section to rupture the interrupter in response to fault-induced internal pressure, the whole being contained in an enclosure.

19 Claims, 1 Drawing Sheet

PROTECTED CAPACITORS

The present invention relates to capacitors that are protected against explosion that otherwise might result upon electrical failure. The invention is particularly applicable to metallized capacitors.

Metallized capacitors have a wound capacitor section comprising "metallized" electrodes separated by strips of dielectric material such as paper or synthetic plastic films. The wound capacitor section is contained in a sealed enclosure that protects it from physical damage and atmospheric contaminatio A metallized electrode is formed by vapor-depositing a film of metal on a dielectric strip or, in some capacitors, on a strip that serves as an inert support. Commonly, the strip is "margined", i.e. left bare along a margin. Two metallized strips are wound with their bare margins at the opposite ends of the wound section. Electrical connection to each metallized electrode is formed variously at respective ends of the wound section as by means of a metal disc or a sputtered metal layer.

The capacitor section is contained in an enclosure having external terminals. In a common capacitor configuration, the enclosure includes a case having a cylindrical side wall and an integral end wall, and the external terminals extend through a sealed end wall at the opposite end of the container. An internal lead extends from each end connection of the capacitor section to a respective capacitor terminal. The winding has a central tube of insulation, and one of the internal leads extends within that tube.

Metallized capacitors are prone to explode violently when internal electrical failure occurs. The present invention provides metallized capacitors with protection against fault-induced explosion. Satisfactory protection has been developed for liquid-filled impregnated metallized capacitors, where the case bulges due to fault-induced pressure, breaking an internal connection. Effective and economical protection for so-called "dry" metallized capacitors has remained a longstanding problem.

The present invention resides in providing novel pressure-responsive protectors for capacitors, and has particular application to dry metallized capacitors. The novel capacitors have a capacitor section in an enclosure and include a fault protector that is also fully contained within the enclosure; the form of the enclosure is not complicated by considerations of fault protection. Internal fault-induced pressure causes a rapid and clean break somewhere along a lead between one of the capacitor terminals and an end connection of the capacitor section.

In the illustrative embodiments of the invention described in detail below, an interrupter in series with the capacitor section includes a lead that is permanently fixed mechanically to one end of the capacitor section. A second part of that lead is fixed to a pressure-responsive wall. In illustrative examples, that wall is a slidable plug or a diaphragm. There is no slack between the first and second parts of the lead. One side of the pressure-responsive wall is exposed to the internal volume containing the capacitor section, where fault-induced pressure develops. At the opposite side of that wall, a cavity is provided inside the capacitor for allowing the wall to move when fault-induced pressure rises. Such pressure tensions and breaks the lead at a point between the fixed part of the lead and the pressure-responsive wall. When the break develops, the wall becomes unrestrained by the lead, so that the wall moves instantly and develops a gap at the rupture. Fault current to the wound section is interrupted, halting further rise of pressure. A hollow core of insulation in the wound section contains the lead of the interrupter in the exemplary embodiments, so that the gap develops in the core, isolated from the faulted winding.

The interrupter and the wound section form an assembly that is contained in the enclosure in the exemplary embodiments, and the fault-induced rupture results from the mechanical and electrical relationships in that assembly.

The illustrative embodiments of the invention detailed below and shown in the accompanying drawings involve further significant aspects of the invention, mentioned below.

Figure 3:
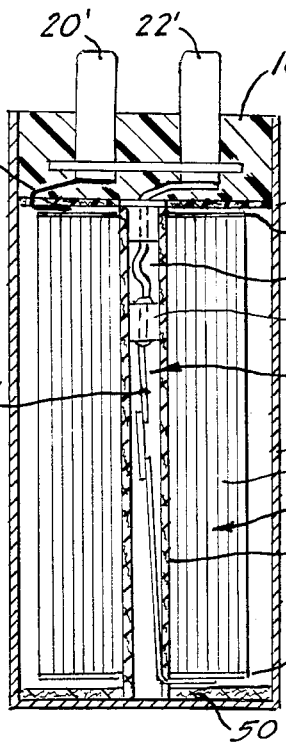
Figure 5:
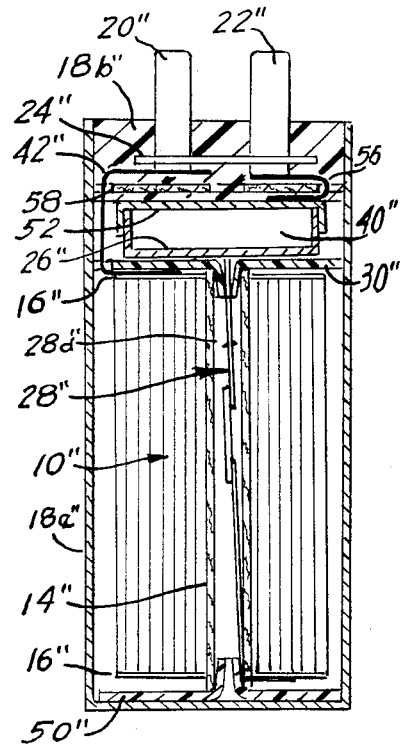
Figure 2:
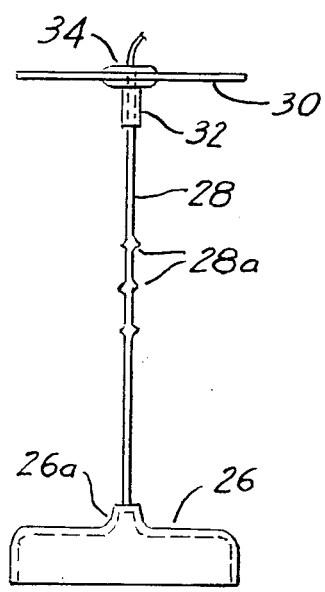
Figure 4:
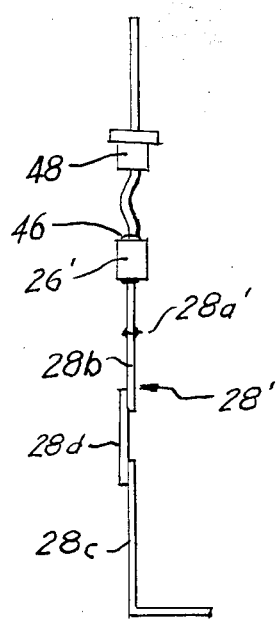
Figure 6:
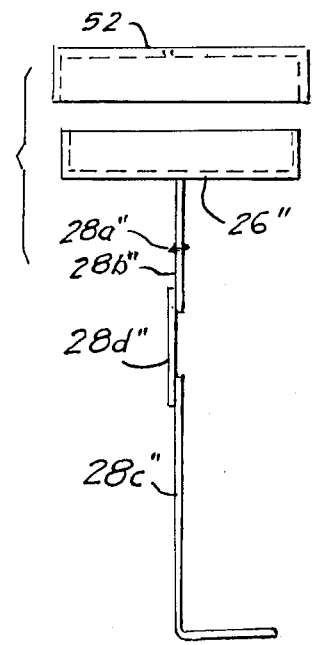

In the drawings:

FIGS. 1, 3 and 5 are longitudinal cross-sections of three capacitors embodying features of the invention; and FIGS. 2, 4 and 6 are side elevations of the assembled elements comprising the protective devices in the capacitors of FIGS. 1, 3 and 5, respectively.

Referring now to FIGS. 1 and 2, a wound capacitor section 10 comprises strips 12 of dielectric material bearing margined metallized electrodes wound on a tubular core 14 of fiber or other suitable insulation, and having sputtered-metal end connections 16 that are joined and securely bonded to the non-margined edges of the two metallized electrodes, respectively.

Capacitor section 10 is contained in an enclosure 18. The enclsoure includes case 18a and a sealed end wall 18b through which terminals 20 and 22 extend. As shown, case 18a is a deep cup having a cylindrical side wall and an integral end wall at the bottom. Terminals 20 and 22 are held in preliminary assembly to each other by a wafer 24 of insulation. End wall 18b is of poured epoxy, for example, completing the sealed enclosure. Case 18a is of insulation; it may be of metal.

The protective device of the capacitor in FIG. 1 appears in FIG. 2. This device includes a diaphragm 26 and a wire 28. Wire 28 has swaged notches 28a that form localized mechanical weakenings. A further or alternative mechanical weak point is a soldered butt joint between wire 28 and the flat top of a central elevated boss 26a of diaphragm 26. A retained washer 30 of insulation and a sleeve 32 of insulation and an eyelet 34 are elements used in assembling the protective device to the capacitor section, as described below in further detail. Diaphragm 26 and wire 28 constitute most of the internal connection extending from the lower end connection 16 of the capacitor section to external terminal 22.

Capacitor section 10 is entirely conventional and is produced in the usual manner. Metallized electrodes are formed on strips of dielectric material so that each strip is margined, i.e. left bare, along one edge of the supporting strip, and so that the electrode extends to the opposite edge of the strip. Two strips are wound so that the electrodes alternate with the dielectric layers. Additional dielectric strips can be included in the winding. Each metallized electrode is recessed from a respective end of the winding. Correspondingly, each electrode extends to a respective end of the winding. In this example, metal is sputtered against the ends of the winding to provide the capacitor section with end connections 16 to the metallized electrodes.

An end of wire 28 has a butt joint to metal diaphragm 26. This may be a weld but here, where this joint serves as a mechanical weak point—or the only mechanical weak point if notches 28a were omitted—the butt point can be formed using a minimal amount of solder. As thus far described, device 26, 28 is assembled to the capacitor section by soldering a wire 36 to one end connection 16 of the capacitor section; threading wire 28 up through core 14; soldering wire 36 to diaphragm 26; sliding sleeve 32 onto wire 28; threading wire 28 through a metal eyelet 34 that is fixed to the center of washer 30 and pulling the wire until diaphragm 26 and washer 30 bear against the ends of the capacitor section and so that there is no slack in the wire; and finally soldering the wire to eyelet 34. In this way, a subassembly is formed consisting of the protective device 26, 28 and the metallized capacitor section 10. Eyelet 34 and washer 30 and sleeve 32 provide an electrically insulated means for fixing a part of wire 28 mechanically in place at the upper end of the wound section. In this construction, the part of wire 28 that is mechanically secured to the upper end of capacitor section 10 is electrically insulated from its upper end connection 16.

A thin layer 38 of fluid epoxy or the like is poured onto the bottom of case 18a and, while that layer is still soft, the unified assembly of capacitor section 10 and the protective device 26, 28 is inserted into case 18a. The outer diameter of diaphragam 26 fits snugly in case 18a. However, layer 38 supplements that fit by forming a rigorous seal. Diaphragm 26 thus forms a barrier between one volume that contains capacitor section 10 (where fault-induced pressure may develop and another volume 40 within case 18a and below diaphragm 26. It will be understood that if the seal between those two volumes were to leak slightly, the rapid build-up of fault-induced pressure in the capacitor section would still activate the diaphragm.

A wire 42 is soldered to upper end connection 16 of the capacitor section. Wire 42 and wire 28 are joined to terminals 20 and 22, respectively, of the capacitor. Poured epoxy forms a sealed closure across the upper open end of case 18a and about terminals 20 and 22.

Capacitor section 10 is fixed in position mechanically in case 18a by engagement of diaphragm 26 against the bottom of case 18a and against the bottom of capacitor section 10; by the engagement of boss 26a with the bore in core 14 and the engagement of the cylindrical periphery of diaphragm 26 with the cylindrical side wall of case 18a; by bearing of washer 30 against the upper end of the capacitor section and the secure retention of washer 30 in position due to the end wall 18b.

The protective device in the capacitor shown in FIG. 1 represents a sensitive, fast-acting current interrupter that responds to fault-induced rise of pressure in the capacitor section. During an interruption, tension in the slack-free length of wire 28 draws its upper fixed part in the direction that tends to maintain (rather than disrupt) the fixed position of that wire part in relation to the upper end of the capacitor section.

Virtually no mechanical yield occurs in the wire or at its ends other than a nominal amount of stretch in the wire itself. For that reason, the wire ruptures at a weakening 28a or at the junction 26a, 28 as soon as diaphragm 26 bulges downward. Space 40 within the capacitor accommodates that motion of the diaphragm. The diaphragm is restrained by the wire up to the moment of rupture; then the diaphragm is instantly free to respond to the built-up pressure so that the diaphragm instantly develops and enlarges a gap between the ruptured ends. That gap develops in the bore of insulating tube 14, isolated from the faulted winding.

The pressure in space 40 is nominal, being suitably sealed against the sudden pressure rise above the diaphragm. To be further assured that the diaphragm will not be restrained by back pressure in space 40, a vent hole 44 is formed through the bottom of case 18a and layer 38.

It is evident that numerous changes can be made in the capacitor of FIG. 1, specifically in its protective device. Diaphragm 26 may have a concentric series of corrugations and it may be made quite thin if necessary, for fast response to internal pressures. Diaphragm 26 may be of plastic, using an eyelet, sealed by solder and sealed to the diaphragm, for fastening wire 28 to the diaphragm and by extending wire 28 to end connection 16 through another sealed eyelet in the diaphragm, thus replacing wire 36. Numerous other changes may be made, particularly in adapting the protective device to other capacitor configurations. However, FIG. 1 represents a distinctive, economical protected capacitor having terminals at one end.

FIGS. 3 and 4 represent another embodiment of certain aspects of the invention, this embodiment having its own merit. The elements of this embodiment corresponding to those of FIGS. 1 and 2 bear primed numerals. In general, the descriptions of the elements and their relationships are the same for FIG. 1 and FIG. 3, so that repetition is unnecessary. Discussion is limited largely to contrasting aspects.

Referring to FIG. 4, the slack-free conductor 28 of FIG. 2 is replaced by a composite conductor 28' including wire segments 28b and 28c, a weakening 28a', and an optional low-temperature responsive fusible element 28d. Plug 26' in FIG. 3 replaces diaphragm 26 of FIG. 1 as a pressure-responsive wall or barrier. Plug 26' as of rubber has a snug sliding fit in the bore of core 14', and wire segment 28b is threaded through the plug. An eyelet 46, curled against the top and bottom of plug 26' and soldered to the wire, serves to fix the plug to the wire and to seal the hole through the plug.

A unitary assembly of the capacitor section and its fault protector is formed as follows. Wire 42' is soldered to upper end connection 16' of the capacitor section; washer 30' is placed on the capacitor section; and the composite conductor 28' bearing plug 26' is threaded into core 14' until plug 26' reaches the position shown, using a suitable lubricant on the plug or in the bore of core 14'. Bushing 48 (which may be slipped onto wire segment 28b in advance) is then pressed into washer 30' and core 14' as shown, preferably developing some curvature in the wire between bushing 48 and plug 26'. The lower end of wire segment 28c is bent across the lower end connection 16' and soldered in place, first taking up the slack in conductor 28b, 28c, 28d. Lubricant is preferably used on bushing 48 and on plug 26' and at the place where wire 28' penetrates bushing 48, to help in the assembly operations and to improve the seals at the ends of space 40'.

The capacitor is completed in the same manner as described for FIG. 1. In the completed assembly, the capacitor section is mechanically held in position in enclosure 18a', 18b' generally the same as in the capacitor of FIG. 1. Insulating washer 30' that tightly receives bushing 48 and second insulating washer 50 at the bottom of case 18a' fit snugly in case 18a' so as to center the capacitor section, and to insulate the capacitor section from the case when (as shown) the case is of metal.

Plug 26' provides a barrier that is air tight (to the degree required) between the volume where fault-induced pressure develops and the space 40' above plug 26'. Some pressure rise occurs in space 40' as soon as the plug shifts upward; but that upward shift occurs only after conductor 28' breaks, developing an interrupter gap.

The parts of wire 28' that are fixed to end connection 16 and plug 26, respectively, are mechanically linked by a slackfree conductor. High fault-induced pressure displaces plug 26'; and any small motion of the plug develops a break in the composite conductor 28'. The plug, no longer restrained by conductor 28', is then pressure-driven to increase greatly the interruption gap. The area of plug 26' can be proportioned in relation to the rupture strength of conductor 28' to break quickly. The joint of conductor 28' to lower end connection 16' of the capacitor section is vastly stronger (due to its configuration and its size) than conductor 28' at the local weakening 28a', so that a well defined interruption gap will certainly develop along the length of conductor 28', at some distance from end connection 16' of the capacitor section. A similar result would occur if weakening 28a' were omitted and fine-gage wire were used all along conductor 28'. However, such a wire would stretch somewhat before breaking, and the interruption would be slightly delayed.

FIG. 5 represents a third embodiment of certain aspects of the invention common to FIGS. 1 and 3. Once again, it is convenient to designate elements of FIG. 5 with the same reference numerals used in FIGS. 1 and 3 for corresponding parts, so that the same descriptions apply for like elements in FIGS. 1, 3 and 5. Double-primed numerals are used in FIG. 5. Descriptions of the parts are the same for FIG. 5 as for correspondingly numbered parts in FIGS. 1 and 3, with exceptions as noted below.

The capacitor section 10" in FIG. 5 is confined between plastic discs 50" and 30", each of which fits snugly in the cylindrical wall of case 18a" and each having a central protrusion that is received in the bore of core 14". This structure (with closure 18b") locates the capacitor section 10" mechanically in position in case 18a". Taut composite lead 28" extends from a soldered joint to lower end connection 16" and along the bore of core 14" to a butt joint to metal diaphragm 26". As in FIG. 1, this butt joint can be a weld or soldered, preferably a weak connection (compared to the break strength of lead 28") to diaphragm 26".

An empty space 40" is provided within the enclosure by cupped diaphragm 26" and a companion metal cup 52 to accommodate upward bulging of diaphragm 26" under fault conditions.

In producing the capacitor of FIG. 5, the interrupter of FIG. 6 is first produced, with cups 26" and 52 nested and sealed to each other. Wire 42" is soldered to the upper end connection 16" of the capacitor section. Along its length, wire 42" is insulated where case 16a" is of metal, if the case is to be insulated from the capacitor terminals. Insulating disc 30" is assembled to one end of capacitor section 10", lead 28" is threaded through disc 30" and section 10"; and with lead 28" held taut, a solder joint is made between lower end connection 16" and a portion of lead 28" lying across end connection 16". As is understood, that joint is much stronger than the weak points along the interrupter, and slack is essentially eliminated from lead 28".

The unified assembly of capacitor section 10" and the interrupter is complete; it is inserted into case 18a" after insulating disc 50" is in place in case 18a" or on the end of the unified assembly. Wire 42" is soldered to terminal 20"; and wire 56 is soldered to cup 52 and to terminal 22. Insulating wafer 58 is laid over cup 52. Epoxy is poured onto the terminal unit 20", 22", 24" and penetrates to cover wafer 58 and (through one or more holes in wafer 58) to become a bonded cover over cup 52.

When a fault-induced pressure develops in capacitor section 10", diaphragm 26" bulges upward. The space bounded by diaphragm 26" and cup 52 is sealed to the requisite degree against entry of gases under pressure. When lead 28" ruptures, diaphragm 26" is no longer restrained by lead 28" so that the diaphragm bulges upward instantly and increases the interruption gap.

In each of the capacitors described above, there are air spaces within the enclosure, spaces not taken by the contained parts or by end-seals. While such spaces may be filled with dielectric liquid or plastic, those spaces may be left empty (as shown) with resulting manufacturing economies.

In each of the described capacitors, the interrupter elements and the capacitor section (together with incidental parts such as insulating washers) constitute a unitary assembly, a physical unit that is inserted into the enclosure. When fault-induced pressure develops in the sealed enclosure, portions of that unit act and react with each other mechanically in developing circuit-rupturing tension and in enlarging the rupture suddenly to form a sizeable gap. There is no dependence on the enclosure to cooperate with the interrupter mechanically in the circuit-rupturing and gapdeveloping operation.

The three explosion-protected capacitors described above are exemplary embodiments of certain common aspects of the invention, each having its own further meritorious aspects. Each one represents a two-terminal dry metallized capacitor that is single-ended, i.e., having its terminals at one end. It will be recognized that the illustrative embodiments are subject to a latitude of modifications by those skilled in the art. Consequently, the invention should be construed in accordance with its true spirit and scope.

What is claimed is:

1. A capacitor including a capacitor section comprising a winding of dielectric strips and electrodes separated by the dielectric strips, at least one of said electrodes being a metal-film electrode, a enclosure containing said capacitor section, and an interrupter in said enclosure constituting a series connection to said capacitor section for protecting the enclosure against exploding due to fault-induced pressure, said interrupter comprising a wall having one side exposed to a volume in the enclosure containing said capacitor section and in which fault-induced pressure develops, means including said wall for defining a cavity in said enclsoure at the side of the wall opposite said one side, said cavity accommodating pressure-responsive movement of at least part of said wall, and an essentially slack-free lead having a joint at one end thereof to a pressure-responsive portion of said wall and having a portion spaced from said end permanently fixed in position relative to said capacitor section such that tension develops in said lead when fault-induced pressure develops in said winding, said interrupter being adapted to rupture and form a gap breaking said series connection in response to said fault-induced pressure.

2. A capacitor as in claim 1 wherein at least one weakening is formed in said interrupter between said wall and said permanently fixed end portion.

3. A capacitor as in claim 1 wherein said wall is a diaphragm restrained by said lead against movement when said fault-induced pressure develops until said interrupter is ruptured and said diaphragm then moving so as to develop a gap in the interrupter.

4. A capacitor as in claim 1 wherein said wall is a metal diaphragm forming part of said series connection, and wherein said joint of the lead to the diaphragm is a distinct mechanically weak point in the interrupter.

5. A capacitor as in claim 1 wherein said wall is a slidable plug that is displaceable to form and increase said gap after said rupture occurs and restraint of the wall by the lead is released.

6. A capacitor as in claim 1 wherein said permanently fixed portion of said lead forms an electrical connection to one end of said capacitor section.

7. A capacitor as in claim 1 wherein the capacitor section has a tubular core of insulation along the axis of the winding and wherein said lead extends along and within said tubular core.

8. A capacitor as in claim 7 wherein said wall is a plug mechanically fixed to said lead and disposed slidably within said tubular core between the ends thereof whereby said cavity is defined at least in part by the tubular core.

9. A capacitor as in claim 1 wherein said wall is a diaphragm disposed across one end of said capacitor section and wherein the permanently fixed portion of the lead is fixed to the opposite end of said winding so as to form an electrical connection to one of said electrodes.

10. A capacitor as in claim 1 wherein said wall forms a permanent seal between said cavity and the volume in which fault-induced pressure develops.

11. A capacitor as in claim 10 wherein said cavity is vented to the exterior of the capacitor.

12. A capacitor including a wound metallized capacitor section and an interrupter, and an enclosure containing said capacitor section and said interrupter, said capacitor section comprising a winding of dielectric strips and a pair of metallized electrodes on a tubular core of insulation and a connection to each of said electrodes at the respective ends of the capacitor section, said interrupter including a diaphragm assembled to one end of the capacitor section and an essentially slack-free lead extending from the diaphragm along and within the tubular core, the lead having a portion that is at least physically located by the capacitor section at a position remote from, said one end so that the capacitor section and the interrupter form a unitary assembly, and means including said diaphragm for constituting a barrier between a volume in the enclosure containing said capacitor section and in which fault-induced pressure develops and a cavity within the enclosure but outside said volume for accommodating deflection of the diaphragm away from the capacitor section, said lead being tensioned in response to such fault-induced pressure and said interrupter being adapted to rupture in response to such tension, said diaphragm then becoming deflected into said cavity and said diaphragm accordingly developing a gap instantly in the interrupter.

13. A capacitor as in claim 12, wherein at least one weakening is formed in said interrupter between said diaphragm and said portion of the lead that is located by the capacitor section.

14. A capacitor as in claim 13 wherein said diaphragm is of metal and is disposed at one end of the wound capacitor section and is connected electrically to the end connection thereat, and wherein the opposite end of the capacitor section locates said physically located portion of the lead but is electrically insulated therefrom.

15. A capacitor as in claim 12, wherein said enclosure has a sealed wall at one end thereof and a pair of terminals in said wall for said capacitor section and its series interrupter, wherein said cavity is located between said sealed wall and said capacitor section, and wherein said physically located portion of said lead is joined to the end connection of said wound capacitor section at the end thereof remote from the diaphragm and remote from said sealed wall.

16. A capacitor section as in claim 12 wherein said enclosure has a sealed end wall opposite one end of the capacitor section and a pair of terminals in said end wall for said capacitor section and its series interrupter, insulation being interposed between said physically located portion of the lead and the end of the capacitor section opposite to said sealed end wall and wherein said diaphragm is disposed across the opposite end of said capacitor section.

17. A capacitor as in claim 12 wherein said diaphragm forms a permanent seal between said cavity and the volume in which fault-induced pressure develops.

18. A capacitor as in claim 17 wherein said cavity is vented to the exterior of the capacitor.

19. A capacitor including a wound metallized capacitor section and an interrupter, and a sealed enclosure containing said capacitor section and said interrupter, said capacitor section comprising a winding of dielectric strips and a pair of metallized electrodes on a tubular core of insulation, said tubular core extending essentially end-to-end in said winding, and first and second end connections to said electrodes, respectively, at the ends of the capacitor section, said interrupter including a plug slidably disposed within said tubular core and spaced from both ends thereof and thereby defining first and second core portions, and an essentially slack-free lead fixed to said plug and extending from the plug along and within said first portion of the tubular core to said first end connection of the capacitor section, a closure for said second core portion remote from said plug, and means including said plug and said first core portion for defining a volume in the enclosure in which fault-induced pressure develops, said closure serving with said plug and said second core portion to define a cavity isolated from said volume for accommodating displacement of said plug away from said first end connection of the capacitor section, said lead being tensioned in response to fault-induced pressure in the winding and said interrupter being adapted to rupture in response to such tension, said plug then becoming displaced into said cavity and said plug accordingly developing a gap instantly in the interrupter.

* * * * *